United States Patent [19]
Lanfranchi

[11] Patent Number: 6,098,781
[45] Date of Patent: Aug. 8, 2000

[54] ORDERLY BOTTLE-FEEDING MACHINE

[75] Inventor: Lino Lanfranchi, Parma, Italy

[73] Assignee: Automazioni Industriali Lanfranchi di Lanfranchi Lino & C. s.n.a., Italy

[21] Appl. No.: 09/101,385

[22] PCT Filed: Nov. 8, 1997

[86] PCT No.: PCT/EP97/06253

§ 371 Date: Jul. 13, 1998

§ 102(e) Date: Jul. 13, 1998

[87] PCT Pub. No.: WO98/21129

PCT Pub. Date: May 22, 1998

[30] Foreign Application Priority Data

Nov. 12, 1996 [IT] Italy .................................. MI96A2346

[51] Int. Cl.$^7$ .................................................. B65G 47/24
[52] U.S. Cl. ........................................... 198/400; 198/396
[58] Field of Search ..................................... 198/400, 396

[56] References Cited

U.S. PATENT DOCUMENTS

| | | | |
|---|---|---|---|
| 3,650,368 | 3/1972 | Nalbach | 198/33 AA |
| 3,662,872 | 5/1972 | Nalbach | 198/33 AA |
| 3,743,076 | 7/1973 | Hooks | 198/33 AB |
| 4,825,995 | 5/1989 | Nalbach | 198/380 |
| 4,979,607 | 12/1990 | Fogg | 198/392 |

FOREIGN PATENT DOCUMENTS

| | | | |
|---|---|---|---|
| 0374107A1 | 6/1990 | Italy | B65G 47/14 |
| 0629571A1 | 12/1994 | Spain | B65G 47/14 |

*Primary Examiner*—Christopher P. Ellis
*Assistant Examiner*—Rashmi Sharma
*Attorney, Agent, or Firm*—Shlesinger, Fitzsimmons & Shlesinger

[57] ABSTRACT

A bottle straightening and aligning machine (10) comprises a bulk bottle loading hopper (11) whose internal side wall bears paddles (12) for pushing the bottles onto a helical guide (14) which extends along the internal wall. At the end of the guide the bottles (13) are unloaded into an annular compartment (15) arranged around the periphery of the upper edge of the hopper where the bottles are taken to run in cradles (21) on a support (18) broken to let the bottles fall into straightening conveyors (22) rotating integrally with the cradles. From the conveyors the bottles are unloaded into peripheral compartments of a ring (20) rotating coaxially around the hopper. The compartments formed in the ring are in a number which is a multiple of the number of the cradles (21) and the conveyors (22) and the rotation speed of the ring (20) is greater than the rotation speed of the cradles (21) to have a peripheral velocity greater than the pitch between two consecutive compartments for each rotation of the cradle corresponding to the unloading of a bottle from each cradle. The hopper and the ring are driven by a common motor by means of mechanisms and gears.

7 Claims, 3 Drawing Sheets

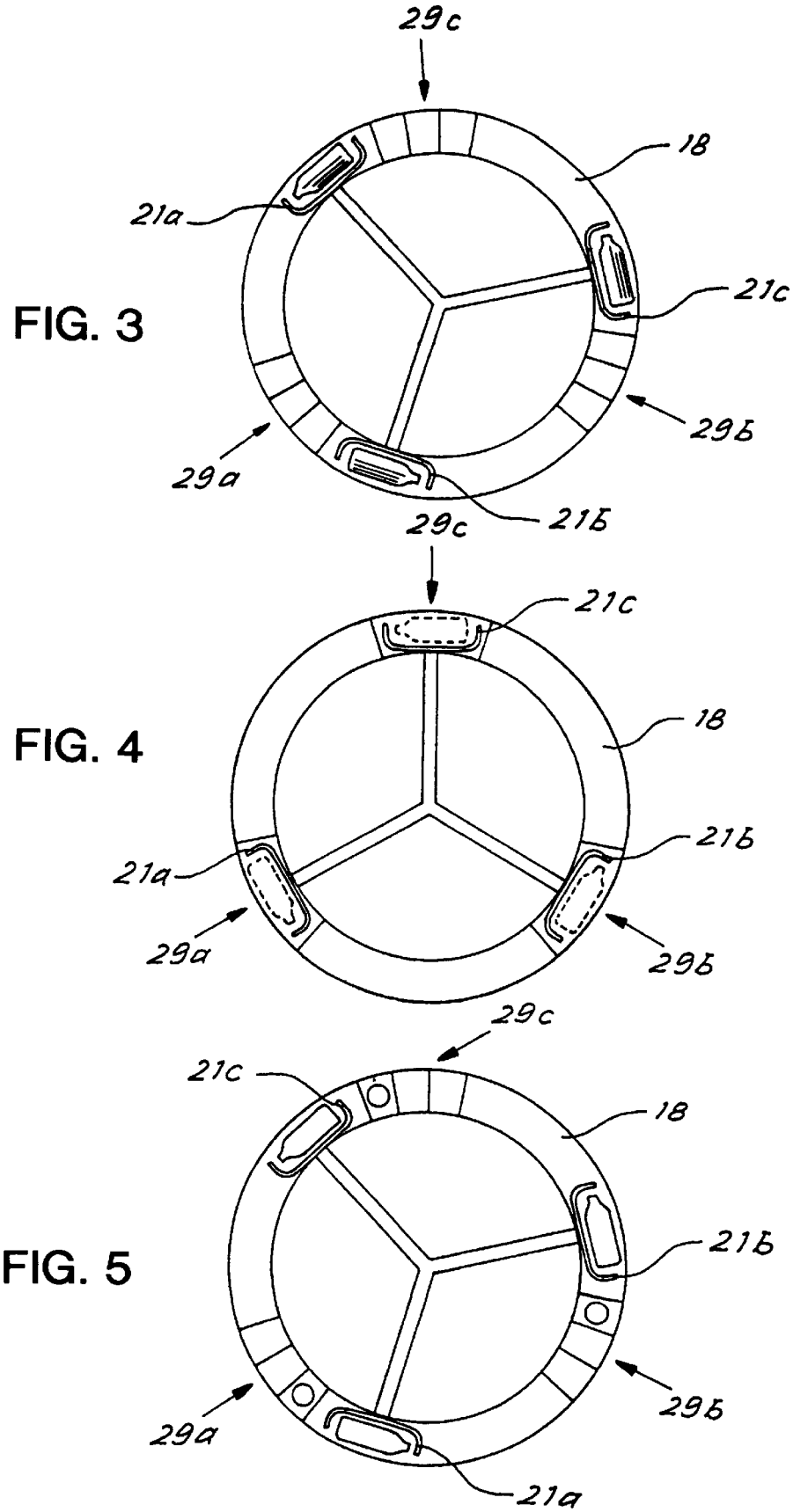

ORDERLY BOTTLE-FEEDING MACHINE

SUMMARY OF INVENTION

The present invention relates to a machine for directing plastic bottles and similar containers taken from a disordered pile and feeding them in an orderly row are known in the prior art.

Feeding machines comprising a hopper in which the bottles to be fed are accumulated in a disorderly manner. Upon rotation of the peripheral wall of the hopper the bottles are pushed to rise on inclined guides until they fall back over the upper edge of the wall to be received in horizontal position by guides which are circumferential to the hopper.

Purpose-made blades push the bottles along the circumferential guides up to openings through which the bottles fall-into underlying carrying cradles which comprise means for straightening the bottles during a subsequent fall through conveyors which direct the bottles which are now arranged vertically towards means of evacuation in an aligned row.

An example of such machines is described in European patent EP 0 374 107.

With the increase in bottling line speed high-speed feeding machines are in growing demand. For various reasons it is however not possible to increase indiscriminately the hopper rotation speed. The structure of present machines therefore involves operational limits which make it unsatisfactory in high-speed lines.

To increase the bottle feed rate machines have been produced in which the ring on which the straightened bottles fall is rotated faster than the hopper. A machine of this type is described for example in U.S. Pat. No. 4,825,995. To secure the above mentioned different rotation speeds the machine described in the prior art calls for a rather complicated mechanism with transmission chains and belts leading to a secondary shaft arranged outside the rotating peripheral ring. It is obvious that a machine configured in this manner displays huge overall dimensions and could be subject to rapid wear of the transmission component parts.

The general purpose of the present invention is to obviate the above mentioned shortcomings by making available a feeding machine which would permit delivering bottles in orderly rows with safety and high operation speed and rotating part drive mechanisms characterized by construction simplicity and limited space occupied.

In view of this purpose it was sought to provide in accordance with the present invention a bottle straightening and aligning machine comprising a bulk bottle-loading hopper whose internal side walls bear pushing blades for the bottles on a helical guide extending along the internal wall from the end of which the bottles are unloaded into an annular compartment arranged peripherally around the upper edge of the hopper where the bottles are taken to run on a support in cradles peripheral to the hopper and rotating therewith with the support being broken to allow the bottles to fall into straightening conveyors rotating integrally with the cradles and from which the bottles are unloaded into peripheral compartments of a ring rotating coaxially to the hopper at a speed greater than that of the hopper and characterized in that the hopper and the ring are supported in rotation by respective coaxial carrousels with the hopper carrousel being driven by a powered shaft and the ring carrousel being driven by a shaft driven in rotation by the powered shaft through gearing with the two shafts being arranged inside the machine beneath the hopper.

To clarify the explanation of the innovative principles of the present invention and its advantages compared with the prior art there is described below with the aid of the annexed drawings a possible exemplifying embodiment applying said principles. In the drawings:

DETAILED DESCRIPTION OF DRAWINGS

Figure 1:
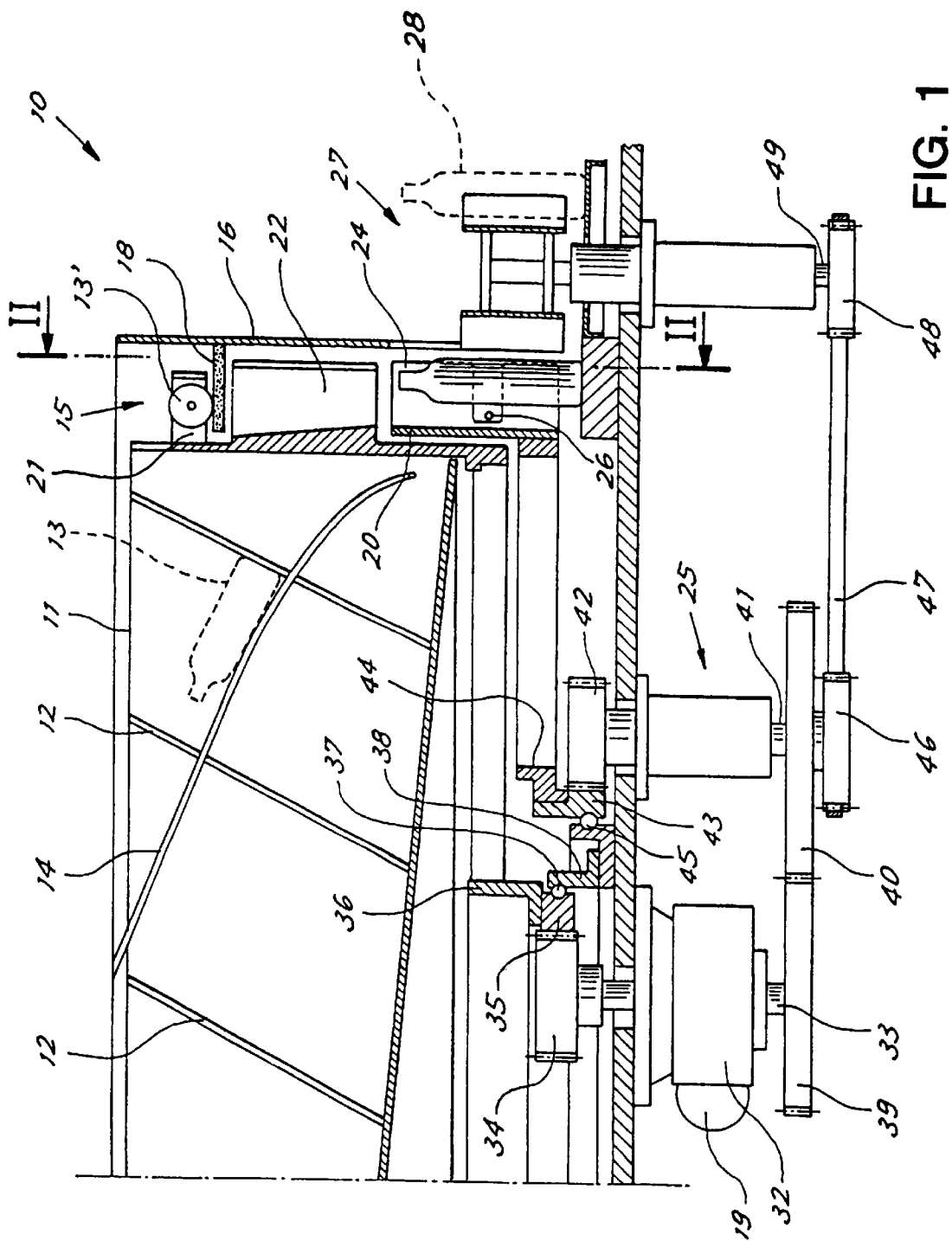
FIG. 1 shows a partial cross section view of a feeding machine provided in accordance with the present invention.

With reference to the figures FIG. 1 shows a cross section of a feeding machine indicated as a whole by reference number 10. The machine 10 comprises a hopper 11 with tapered bottom having on its wall a plurality of ribs 12 for pushing the bottles 13 contained in the hopper along suspended guides 14. The bottles pushed along the guides 14 fall over the top edge of the hopper into a space 15 located between the hopper wall and a fixed containment wall 16. In the interwall space 15 are guides 18 circumferential to the hopper. The rotating hopper is motorized with an electric motor 19 and has cradles 21 for pushing the bottles (indicated by 13') along the guides 18. As known in the field the guides 18 have breaks which allow the bottles to fall into underlying funnel-shaped conveyors 22 rotating integrally with the cradles 21 and vertically under them. The conveyors direct the standing bottles towards outlet means of an orderly row of bottles. The cradles 21 have known means 23 for ensuring falling of the bottles in a standing position within the conveyor 22.

In the interwall space 15 beneath the conveyors 22 rotates a ring 20 of radial separators 24 each designed to receive a standing bottle unloaded from the conveyors. The ring 20 is rotated coaxially to the hopper by means of a mechanism 25 driven by the same motor 19 with a motion relationship which is clarified below. A finger-type extracting device 26 extracts the bottles from the ring when they arrive opposite a removal device with rotating blades 27 which takes the bottles which are moved radially by the extractor 26 to take them into a position 28 where conventional transport means (for example a belt conveyor) take them to send them along the line fed by the machine 10.

As may be seen in FIG. 1 the motor 19 rotates through a reducer 32 a shaft 33 on which is keyed a pinion gear 34 for driving a thrust bearing 35 supporting a carrousel 36 integral with the hopper 11. Suitable roller bearings 37 are interposed between the thrust bearing 35 and the machine bed 38 to ensure correct rotation of the carrousel.

To the shaft 33 is also keyed a ring 39 engaging another ring 40 coaxial to a secondary shaft 41 bearing in turn a respective pinion gear 42. With the pinion gear 42 is geared a second thrust bearing 43 supporting a second carrousel 44 integral with the ring 20 which receives the bottles. Bearings 45 are placed between the thrust bearing 43 and the bed 38.

To the secondary shaft 41 can be keyed advantageously a pulley 46 driving through a belt 47 and a driven pulley 48 an auxiliary shaft 49 for control of the rotation of the bottle removal device 27.

It is clear from the above description that the carrousel drive device of the machine in accordance with the present invention permits significant simplification of the structure and the mechanisms as compared with the prior art machines to also allow reduction of overall dimensions since the shafts 33, 41 with their associated coupling gearing are arranged inside the outline of the machine beneath the hopper.

In FIGS. 3–5 is shown diagramatically an operational cycle of the machine to clarify the synchronism relationship between the cradles 21 and the ring 20. For the sake of simplicity FIGS. 3–5 show only three cradles 21a, 21b, 21c spaced 120° apart. In reality the cradles can be more numerous for example twenty-one always uniformly distributed around the circumference. The guides 18 are also three in number divided by fall passages 29a, 29b, 29c. The fall passages are sufficiently wide to allow the fall of a bottle virtually horizontally so as to allow its vertical rotation during the fall into the conveyor.

As will be clear to one skilled in the art the guides 14 are arranged so as to insert a new bottle in one of the cradles 21 when the cradle empties into the respective conveyor.

At the beginning of a cycle (FIG. 3) the cradles are thus filled with bottles horizontal on the guides 18. Rotation of the cradles takes the bottles over the openings 29 (FIG. 4). The bottles thus fall through the conveyors and enter vertically each into a cell or compartment of the ring 20. After falling of the bottles the cradles are again empty and ready to receive three more bottles (FIG. 5). At this point the transport and fall cycle of the bottles into the cradles is repeated identically. For example the cradle 21a between the point 29a of the first unloading and the point 29b receives a new bottle. The cradle 21a continues rotating and reaches position 29b where it unloads the new bottle into the conveyor 22 fixed beneath the cradle. From the conveyor the bottle falls into the separator 24 but in its travel between 29a and 29b the rotation mechanisms of the cradles and the ring 20 cause the ring 24 to rotate in relation to the cradles by one 'step', that is the length of one of the ring compartments. In this manner opposite the conveyor at point 29b there arrives the compartment following the compartment filled in the preceding cycle. Behaviour during the next travel between 29b and 29c will be identical.

In this manner in one complete rotation each cradle unloads three bottles into three successive compartments. With twenty-one cradles there will thus be delivered 60 bottles with each rotation.

This allows a considerable increase in the frequency of delivery of the bottles with respect to what it was possible to achieve with the prior art machines.

At this point it is clear that the preset purposes have been achieved.

Naturally the above description of an embodiment applying the innovative principles of the present invention is given by way of non-limiting example of said principles within the scope of the exclusive right claimed here and therefore must not be taken as a limitation of the scope of the exclusive right claimed here.

For example the number and shape of the cradles can be modified depending on specific requirements.

The fall frequency of the bottles into the seats 24 of the rotating ring is especially high and the arrangement of the seats is brought closer for achievement of the high productivity pursued by the invention. Therefore correct feeding of the bottle falling from the conveyor into the ring compartment is also critical.

Theoretically the bottle is intended to fall into the seat when the seat is perfectly aligned with the conveyor. But this situation cannot occur with precision and steadiness in practice. The bottle falling with a slight advance in time therefore strikes the side wall of the seat and rebounds even strongly and in falling back may not be received in the compartment, thus causing considerable shortcomings in the regularity of the machine operation.

To remedy these shortcomings in accordance with the present invention the side wall of the compartment which is in front in the direction of travel of the ring has its upper edge beveled towards the interior of the compartment and the synchronism between rotation of the wheel and falling of the bottle is such that the fall takes place with a slight advance in time before the instant of alignment between the conveyor axis and the compartment axis. The bottle bottom strikes this inclined bevel and receives a rebounding thrust which has a minor component upwards and has a thrust component of the bottle in alignment with the compartment which greatly facilitates entry of the bottle therein.

Figure 2:
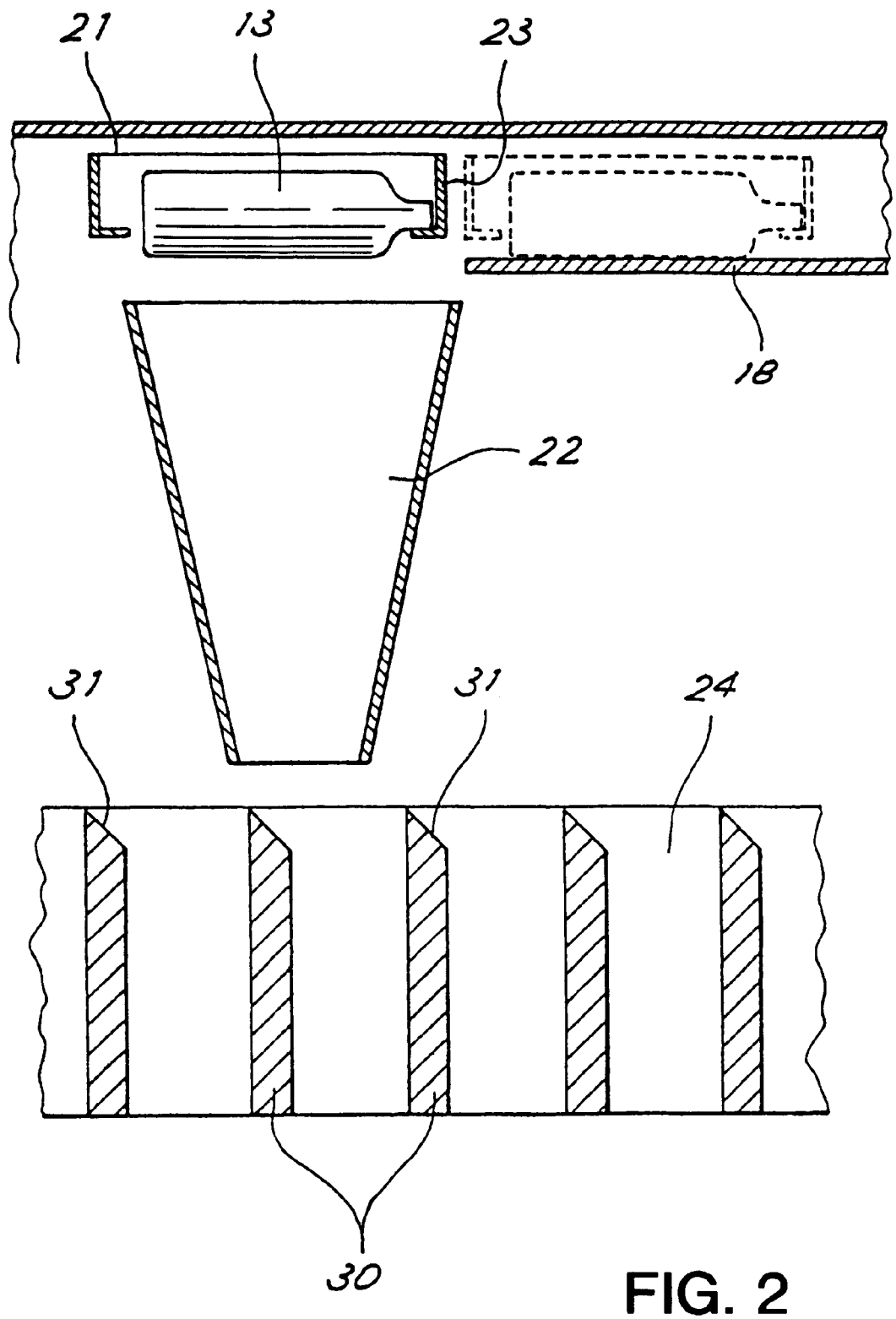
FIG. 2 shows a diagrammatic view along plane of cut II—II of FIG. 1, and FIGS. 3–5 show exemplifying views of the operational cycle of a machine in accordance with the present invention.

FIG. 2 shows how the separating wall 30 between the compartments has its upper edge beveled with an inclined surface 31. The bottom of the bottle falling vertically has a rebound trajectory with an important straightening component of the bottle while the vertical rebound component is drastically reduced. To obtain such an effect in a noticeable manner the surface 31 must offer a relatively small angle with the compartment axis for example preferably non more than 45°.

What is claimed is:

1. Bottle straightening and aligning machine (10) comprising a bulk bottle loading hopper (11) whose internal side wall bears paddles (12) for pushing the bottles onto a helical guide (14) extending along said internal wall from the end of which the bottles (13) are unloaded into an annular compartment (15) arranged around the periphery of the upper edge of the hopper where the bottles are taken to run on a support (18) in cradles (21) peripheral to the hopper (11) and rotating therewith with the support (18) being broken to let the bottles fall into straightening conveyors (22) rotating integrally with the cradles and from which the bottles are unloaded into peripheral compartments of a ring (20) rotating coaxially with the hopper at a greater speed than it and characterized in that the hopper (11) and the ring (20) are supported in rotation by respective mutually coaxial carrousels (36,44) with the carrousel (36) of the hopper (11) driven by a powered shaft (33) and the carrousel (44) of the ring (20) being driven by a shaft (41) driven in rotation by the powered shaft (33) through gearing (39,40) with the two shafts (33,41) being arranged inside the machine beneath the hopper.

2. Machine in accordance with claim 1 characterized in that the shafts (33,41) are counter-rotating with respective pinion gears (34,42) being keyed thereon to cause rotation of the coaxial toothed thrust bearings (35,43) supporting the respective carrousels (36,44).

3. Machine in accordance with claim 1 characterized in that the compartments formed in the ring are in a number which is a multiple of the number of said cradles (21) and said conveyors (22) and the rotation speed of the ring (20) is greater than the rotation speed of the cradles (21) to have a peripheral speed greater than the pitch between two consecutive compartments for each rotation of the cradle corresponding to the unloading of a bottle from each cradle.

4. Machine in accordance with claim 1 characterized in that the compartments formed in the ring (20) are in a number triple the number of cradles (21) minus three.

5. Machine in accordance with claim 1 characterized in that the straightening conveyors (22) are funnel shaped.

6. Machine in accordance with claim 1 characterized in that the compartments formed in the ring (20) are separated by walls (30) having beveled upper edges (31).

7. Machine in accordance with claim 6 characterized in that the beveled upper edge (31) of the separating walls (30) of the compartments has a sloping surface forming with the axis of the compartment an angle not greater than 45°.

* * * * *